US012200018B2

(12) United States Patent
Badar et al.

(10) Patent No.: US 12,200,018 B2
(45) Date of Patent: Jan. 14, 2025

(54) PROVIDING SELECTIVE IMS SERVICES TO ENDPOINTS

(71) Applicant: T-MOBILE INNOVATIONS LLC, Overland Park, KS (US)

(72) Inventors: Saqib Badar, Bellevue, WA (US); Mehul Jayant Shah, Sammamish, WA (US); A. Karl Corona, Maple Valley, WA (US); Ayman Zaki, Renton, WA (US)

(73) Assignee: T-MOBILE INNOVATION LLC, Overland Park, KS (US)

( * ) Notice: Subject to any disclaimer, the term of this patent is extended or adjusted under 35 U.S.C. 154(b) by 0 days.

(21) Appl. No.: 18/316,854

(22) Filed: May 12, 2023

(65) Prior Publication Data

US 2024/0380793 A1 Nov. 14, 2024

(51) Int. Cl.
*G06F 15/16* (2006.01)
*H04L 65/1016* (2022.01)
*H04L 65/1104* (2022.01)

(52) U.S. Cl.
CPC ...... *H04L 65/1016* (2013.01); *H04L 65/1104* (2022.05)

(58) Field of Classification Search
None
See application file for complete search history.

(56) References Cited

U.S. PATENT DOCUMENTS

| | | | | |
|---|---|---|---|---|
| 5,999,525 | A * | 12/1999 | Krishnaswamy | H04L 65/104 379/114.15 |
| 6,731,625 | B1 * | 5/2004 | Eastep | H04L 69/16 379/93.07 |
| 6,779,030 | B1 * | 8/2004 | Dugan | H04Q 3/0037 379/221.08 |
| 9,826,072 | B1 * | 11/2017 | Filart | H04L 69/22 |
| 2011/0143754 | A1 * | 6/2011 | Jiang | H04W 4/24 455/432.1 |
| 2012/0225652 | A1 * | 9/2012 | Martinez | H04L 67/54 455/435.1 |

(Continued)

OTHER PUBLICATIONS

"Digital cellular telecommunications system (Phase 2+); Universal Mobile Telecommunications System (UMTS); LTE; Architectural requirements", Technical Specification, ETSI TS 123 221, 3GPP TS 23.221, Version 12.0.0, Release 12, pp. 1-54 (Oct. 2014).

(Continued)

*Primary Examiner* — Phuoc H Nguyen
(74) *Attorney, Agent, or Firm* — Shook, Hardy & Bacon L.L.P.

(57) ABSTRACT

Methods and systems for restricting communication services over a network. The method includes detecting a Session Initiation Protocol (SIP) register message originating from a specific network Public Land Mobile Network (PLMN) that is included in a restricted PLMN list identified by a P-Access-Network-Information header (P-ANI). The method further includes implementing a policy to remove RCS and presence capability feature tags from a subsequent SIP register message. The lack of feature tags to Serving Call Session Control Function (S-CSCF) will prohibit triggering of Third Party Registration to different application servers.

20 Claims, 4 Drawing Sheets

(56) References Cited

U.S. PATENT DOCUMENTS

| | | | | |
|---|---|---|---|---|
| 2014/0304505 A1* | 10/2014 | Dawson | ............. | G06F 21/6227 |
| | | | | 713/165 |
| 2016/0037471 A1* | 2/2016 | Mufti | .................... | H04W 36/14 |
| | | | | 370/328 |
| 2016/0248814 A1* | 8/2016 | Mufti | ....................... | H04L 69/24 |
| 2018/0176266 A1* | 6/2018 | Filart | ...................... | H04L 65/80 |
| 2018/0324235 A1* | 11/2018 | Mufti | .................. | H04L 65/1104 |
| 2022/0360663 A1* | 11/2022 | Kempson | .......... | H04M 3/42306 |
| 2023/0268982 A1* | 8/2023 | Li | ..................... | H04B 7/15507 |
| | | | | 370/315 |

OTHER PUBLICATIONS

Universal Mobile Telecommunications System (UMTS); LTE; 5G; Non-Access-Stratum (NAS) protocol for Evolved Packet System (EPS), Technical Specification, ETSI TS 124 301, Stage 3, 3GPP TS 24.301, version 15.4.0, Release 15, pp. 1-254 (Oct. 2018) . . . Part 1.

Universal Mobile Telecommunications System (UMTS); LTE; 5G; Non-Access-Stratum (NAS) protocol for Evolved Packet System (EPS), Technical Specification, ETSI TS 124 301, Stage 3, 3GPP TS 24.301, version 15.4.0, Release 15, pp. 255-507 (Oct. 2018) . . . Part 2.

\* cited by examiner

PROVIDING SELECTIVE IMS SERVICES TO ENDPOINTS

TECHNICAL FIELD

The present invention relates generally to controlling voice call attempts & certain features of Rich Communication Service (RCS) in a communication network, and more specifically to a system, method, and computer program product for rejecting voice call attempts & limit certain aspects of RCS such as File Transfer, chatbot, large message etc., based on specific criteria.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

The present invention provides a system, method, and computer program product for controlling voice call attempts in a communication network. The system includes a Session Border Gateway (SBG) or a Proxy-Call Session Control Function (P-CSCF) network element configured with a policy for rejecting voice call attempts based on specific criteria. The system also includes control of registration for information management system (IMS) services, one of which is voice service.

The method includes receiving a session initiation protocol (SIP) invite message at an SBG or P-CSCF network element, checking the P-Access-Network-Information header (P-ANI) to determine if the SIP invite originated from a specific network PLMN that is on a list of restricted PLMNs, checking the 'Accept-contact' header to determine if the SIP invite contains 'mmtel', and returning an appropriate SIP error code (e.g., 503) to the device if the SIP invite satisfies both criteria.

The computer program product includes computer-executable instructions for controlling voice call attempts. The computer-executable instructions include instructions for receiving a SIP invite message, instructions for checking the P-Access-Network-Information header (P-ANI) and the 'Accept-contact' header, and instructions for returning an appropriate SIP error code if the SIP invite satisfies both criteria.

BRIEF DESCRIPTION OF THE DRAWINGS

The present technology is described in detail herein with reference to the drawing figures, which are intended to be exemplary and non-limiting in nature, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms 3G Third-Generation Wireless Technology
4G Fourth-Generation Cellular Communication System
CD-ROM Compact Disk Read Only Memory
CDMA Code Division Multiple Access
eNodeB Evolved Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that describes these terms may be found in Newton's Telecom Dictionary, 32nd Edition (2022).

A "mobile device," as used herein, is a device that has the capability of using a wireless communications network, and may also be referred to as a "user device," "wireless communication device," or "user equipment (UE)." A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, and/or LTE Advanced, among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same. By way of example, and not limitation, computer-readable media may include computer storage media and/or communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

Communication networks are rapidly evolving to become "hybrid" with both terrestrial and non-terrestrial networks available to end-users for their connectivity requirements. In many cases, non-terrestrial (satellite) networks extend and augment terrestrial networks, and are resource-constrained on the access network due to the kind and amount of spectrum deployed for such networks. For example, non-terrestrial network operators may lease limited amounts of spectrum from terrestrial network operators for use on such non-terrestrial networks. The limited number of users that can be supported over such a scarce amount of spectrum requires that only a subset of communication services be available to end-users over this link. As an example, only messaging and low data-rate services would be available, while voice support would not be desired or made available.

The problem arises when devices classified as "voice-centric" (such as smartphones) are designed to prefer radio access networks that offer voice services. If voice services are not supported, the device is programmed to re-scan and select an alternative radio access network that supports voice. This poses a significant issue when voice services are not to be made available on resource-constrained links, as voice-centric devices will simply re-scan and move away to alternative networks if available. This risks leaving endpoints in geographic locations where only a non-terrestrial network is available without any communication services.

This disclosure aims to solve this problem by introducing a method that enables voice-centric devices to latch onto radio access networks that do not support voice. Specifically, the disclosure proposes a policy configuration for the IMS network, such as the Session Border Gateway (SBG) or the P-CSCF, to reject voice call attempts from the device based on specific criteria. The policy states that if the SIP invite originates from a specific network Public Land Mobile Network (PLMN), which is in the list of restricted PLMNs identified by the P-Access-Network-Information header (P-ANI), and if the SIP invite contains "mmtel" in the "Accept-contact" header, an appropriate SIP error code will be returned to the device. This ensures that voice-centric devices remain connected to the non-terrestrial network and only non-voice services are utilized, preventing the devices from automatically scanning for alternate networks and risking no communication services being available to endpoints in geographic locations where a non-terrestrial network is the only available network.

The present invention provides a method and system for managing communication sessions originating from restricted origins. The system includes a controller, a receiver, a monitor, an analyzer, and a configure engine. The receiver is configured to receive a request from a user device to initiate a communication session between the node and the user device. The monitor is configured to determine that the request to initiate the communication session originates from a restricted origin. The analyzer is configured to determine that the request contains a first header, and the configure engine is configured to instruct the node to remove one or more feature capabilities from the communication session.

In accordance with one aspect of the present invention, a method is provided for managing communication sessions originating from restricted origins. The method includes receiving, at a node, a request to initiate a communication session between the node and the user device. The method further includes determining that the request to initiate the communication session originates from a restricted origin and instructing the node to remove one or more feature capabilities from the communication session.

In accordance with another aspect of the present invention, a computer-readable storage medium is provided. The storage medium includes instructions for managing communication sessions originating from restricted origins. The instructions, when executed by a processor, cause the processor to receive, at a node, a request to initiate a communication session between the node and the user device. The instructions further cause the processor to determine that the request to initiate the communication session originates from a restricted origin and instruct the node to remove one or more feature capabilities from the communication session.

Figure 1:
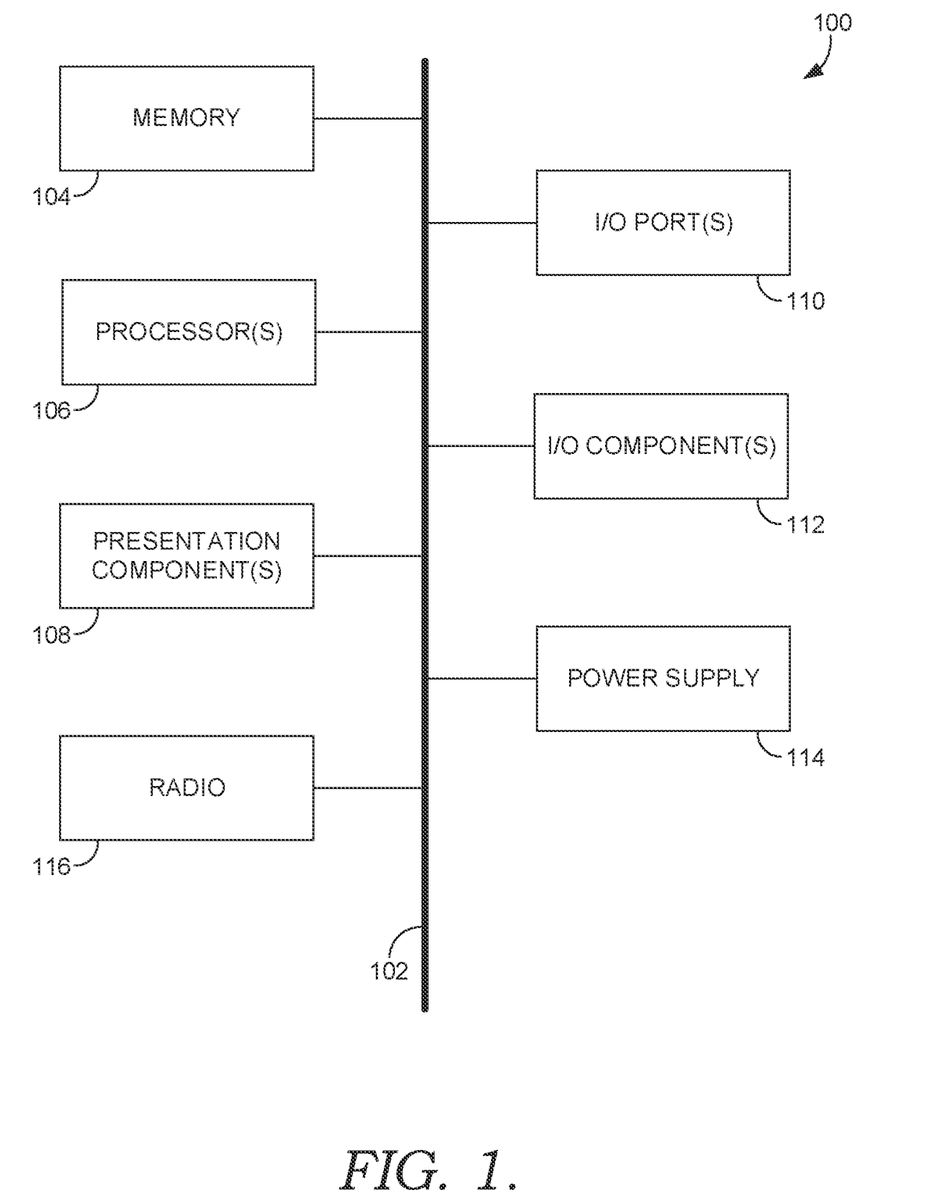
FIG. 1 depicts an exemplary computing environment suitable for use in implementation of the present disclosure.

In accordance with yet another aspect of the present invention, a system is provided for managing communication sessions originating from restricted origins. The system includes a receiver configured to receive a request from a user device to initiate a communication session between the node and the user device. The monitor is configured to determine that the request to initiate the communication session originates from a restricted origin Referring to the drawings in general, and initially to FIG. 1, an exemplary computing environment 100 suitable for practicing embodiments of the present technology is provided. Computing environment 100 is but one example, and is not intended to suggest any limitation as to the scope of use or functionality of the embodiments discussed herein. Neither should the computing environment 100 be interpreted as having any dependency or requirement relating to any one or a combination of components illustrated. It should be noted that although some components in FIG. 1 are shown in the singular, they may be plural. For example, the computing environment 100 might include multiple processors and/or multiple radios. As shown in FIG. 1, computing environment 100 includes a bus that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 may take the form of memory components described herein. Thus, further elaboration will not be provided here, but it should be noted that memory 104 may include any type of tangible medium that is capable of storing information, such as a database. A database may be any collection of records, data, and/or information. In one embodiment, memory 104 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 108 may include a display, a speaker, and/or other components that may present information (e.g., a display, a screen, a lamp (LED), a graphical user interface (GUI), and/or even lighted keyboards) through visual, auditory, and/or other tactile cues.

Radio 116 may facilitate communication with a network, and may additionally or alternatively facilitate other types of wireless communications, such as Wi-Fi, WiMAX, LTE, and/or other VoIP communications. In various embodiments, the radio 20 may be configured to support multiple technologies, and/or multiple radios may be configured and utilized to support multiple technologies.

The input/output (I/O) ports 110 may take a variety of forms. Exemplary I/O ports may include a USB jack, a stereo jack, an infrared port, a firewire port, other proprietary communications ports, and the like. Input/output (I/O) components 112 may comprise keyboards, microphones, speakers, touchscreens, and/or any other item usable to directly or indirectly input data into the computing environment 10.

Power supply 114 may include batteries, fuel cells, and/or any other component that may act as a power source to supply power to the computing environment 10 or to other network components, including through one or more electrical connections or couplings. Power supply 26 may be configured to selectively supply power to different components independently and/or concurrently.

Figure 2:
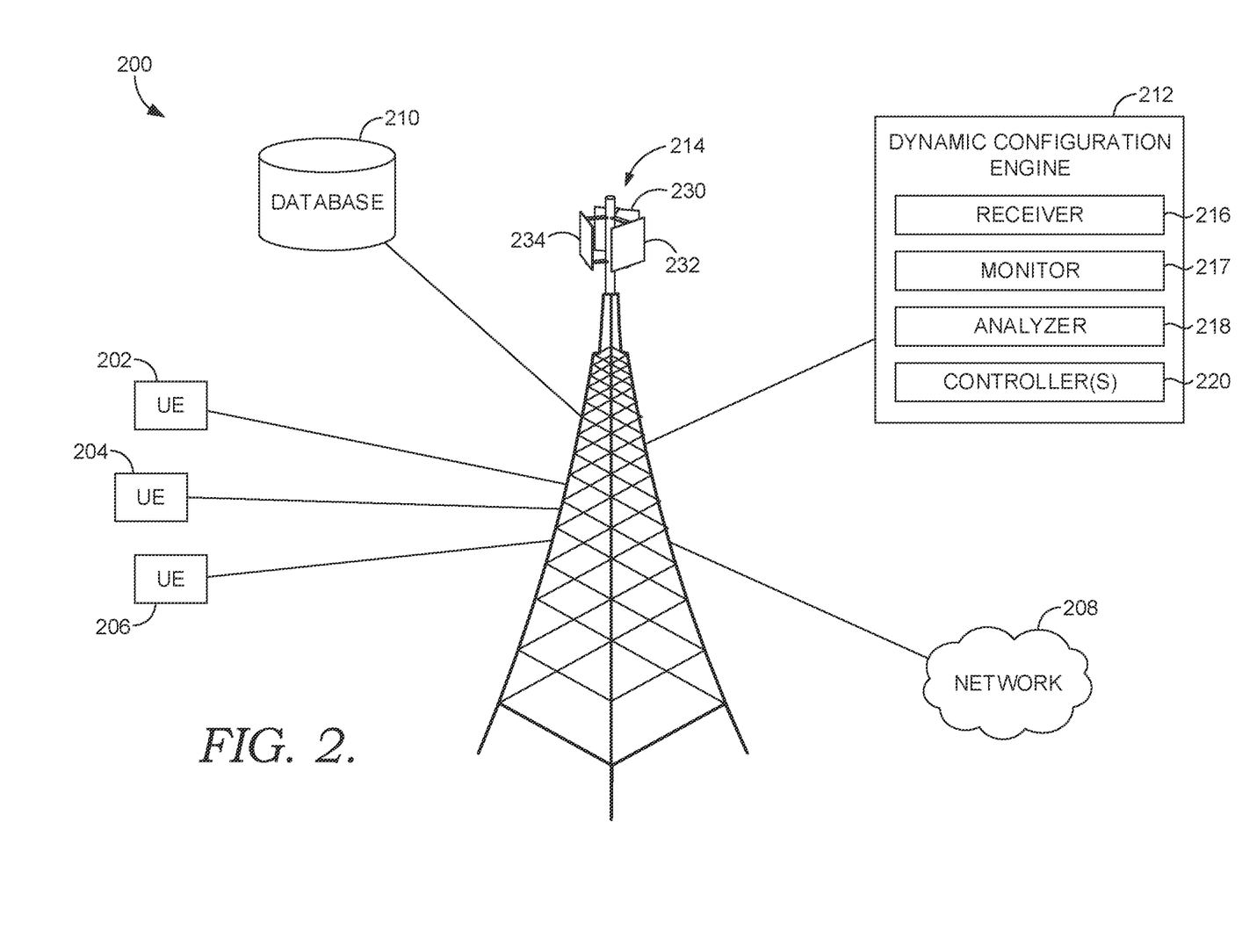
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic configuration engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing device 100 in FIG. 1. Thus, a user device may include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user devices 202, 204, and 206 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to any or all of the user devices 202, 204, and 206. For example, network 208 may be associated with a telecommunications provider that provides services (e.g., LTE) to the user devices 202, 204, and 206. Additionally or alternatively, network 208 may provide voice, text, and/or data services to user devices or corresponding users that are registered or subscribed to utilize the services provided by a telecommunications provider. Network 208 may comprise any communication network providing voice, text, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the user devices 202, 204, and 206 that are located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the user devices 202, 204, and 206 when the uses devices 202, 204, and 206 are geographically situated outside of the cell associated with cell site 214. In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with dynamic configuration engine 212, which comprises various components that are utilized, in various implementations, to perform one or more methods for identifying and determining if one or more UEs operating on a single cell with a restricted portion of a broadcasted spectrum. Generally, the dynamic configuration engine 212 may implement various coding techniques to reduce a UEs use of a bandwidth portion. In some implementations, dynamic configuration engine 212 comprises components including a receiver 216, a monitor 217, an analyzer 218, and a controller 220. However, in other implementations, more or less components than those shown in FIG. 2 may be utilized to carry out aspects of the invention described herein. The components of dynamic configuration engine 212 may take any one or more of many forms, but specifically may comprise one or more processors and/or servers configured to perform the functions described herein.

The receiver 216 of the dynamic configuration engine 212 is generally responsible for receiving information from various user devices, such as the user devices 202, 204, and 206, when located within the coverage area of cell site 214. Information sent from a user device to the cell site 214 may comprise location information of the user device and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed signal-to-interference-plus-noise ratio (SINR) and/or signal strength at the user device(s), or throughput of the connection between the cell site and the user device(s). Location and channel quality information may take into account the user device's capability, such as the number of antennas of the user device and the type of receiver used by the user device for detection. The receiver may be associated with a non-terrestrial network environment.

The receiver 216 can be any device associated with a network or cell site that is capable of receiving and processing SIP register requests from a (UE) attempting to establish a communication session. The receiver 216 may be implemented as a network element, such as a Proxy-CSCF (P-CSCF) or a Session Border Controller (SBC), or may be integrated into other network components, such as a home subscriber server (HSS) or a Serving-CSCF (S-CSCF). The receiver 216 is configured to receive the SIP register request from the UE and check the originating PLMN against a list of restricted PLMNs identified by the P-Access-Network-Information header (P-ANI) to determine if the UE is attempting to connect from a non-terrestrial PLMN. If the UE is connecting from a restricted PLMN, the receiver applies a policy to remove rich communication services (RCS) and presence capability feature tags from the invite and prohibits triggering third party registration to different application servers.

RCS is a communication protocol designed to provide enhanced messaging and multimedia communication services beyond the basic TEXT and MMS services. RCS enables features such as group chat, file sharing, video calls, and read receipts. Presence feature tags, on the other hand, allow a user to indicate their availability status to other users in a network, indicating if they are available, busy, or offline. Presence feature tags also avails the user's capability because not all users or device have the same capability. The presence feature tag is typically used in conjunction with instant messaging and other real-time communication services to provide an indication of a user's availability. A trigger point rule (TPR) is a feature in the IMS that enables intelligent routing of SIP (Session Initiation Protocol) messages to appropriate application servers based on the content of the message. TPR is used to route SIP messages to different application servers depending on the message content. For example, if a SIP invite message contains a specific feature tag to initiate or establish a voice, video or RCS call, TPR can be used to route the message to an appropriate application server that handles the specific feature. TPR is used to enable intelligent routing and handling of SIP messages within an IMS network, ensuring that messages are directed to the correct application server for processing.

The SIP register message contains various pieces of information, including the identity of the user agents involved in the session, the type of session being initiated, the media format being used, and other relevant information necessary to establish and manage the session. The SIP register message allows integrity-protection, authentication, and user subscription validation and is used to allow and subscribe to various IMS services.

Monitor 217 is a component that continuously analyzes the network traffic flowing through it to determine if any SIP register messages originate from a specific network PLMN that is in the list of restricted PLMNs identified by the P-Access-Network-Information header. The list of restricted PLMNs may be any UE that is operating using a non-terrestrial network portion. The list of restricted PLMNs may also be any PLMN that is remote, roaming, or operating with a high bandwidth load. The list of restricted PLMNs may also be dynamic such that a PLMN may be in a high traffic area and then put on the restrict list and may be removed once conditions improve. The list of PLMNs may be based on a determination that the PLMN is associated with a resource constrained access network. Once such a message is detected, the monitor applies the policy to remove the RCS and presence capability feature tags from the register request messages. It ensures that the S-CSCF does not receive the tags and is therefore unable to trigger third party registration to different application servers, in this case RCS and presence. Additionally, the monitor enforces blocking for any RCS and presence incoming traffic that does not comply with the limited feature tag response. The monitor 217 ensures that these policy rules are applied correctly and consistently across all network traffic, thus preventing unauthorized access to the restricted services.

The analyzer 218 is generally responsible for combining the information and/or indications from the receiver 216 with the information monitored by the monitor 217. For example, the analyzer 218 may receive an indication from the receiver 216 that one or more SIP messages are originating from a restricted PLMN. The network traffic flowing through analyzer 218 is used to identify specific SIP messages that violate the policy rules established by the receiver and monitor components. In particular, the analyzer 218 identifies any RCS invite message, or presence subscribe and publish messages that are blocked by the monitor 217. Once such messages are detected, the analyzer generates an appropriate SIP error code, such as a 503 Service Unavailable or a 404 Not Found, in response to the incoming traffic. The analyzer 218 ensures that the policy rules are enforced and that any non-compliant traffic is effectively blocked from accessing the restricted services such as voice or data driven services. Additionally, the analyzer 218 may also log and report any violations of the policy rules for further analysis and audit purposes.

The controller 220 is generally responsible for managing the overall operation of the system and ensuring that the policy for removing RCS and presence feature tags is implemented correctly. The controller 220 receives information from the monitor, analyzer, and configure engine to make informed decisions about network access for devices. It uses this information to determine if a SIP register originates from a specific network PLMN that is in the list of restricted PLMNs identified by the P-Access-Network-Information header (P-ANI). If so, the controller 220 instructs the dynamic configuration engine 212 to remove RCS and presence capability feature tags from the invite. The controller 220 then enforces additional blocking measures, as necessary, to prohibit triggering third party registration to different application servers, in this case RCS and presence. The controller also ensures that the final message back to the UE lacks any of the RCS feature tags. The controller 220 enforces these policies to ensure that network access is limited for voice-centric devices on resource-constrained links.

Additionally, the controller 220 receives input from network administrators specifying which network PLMNs should be restricted, which feature tags should be removed from SIP messages, and which types of incoming traffic should be blocked. Based on these inputs, the controller 220 configures the receiver 216 and monitor 217 to enforce the specified policy rules. Additionally, the controller 220 also maintains the list of restricted PLMNs and feature tags to be removed from SIP messages, and provides an interface for network administrators to modify these lists as needed. The controller 220 ensures that the policy rules are up-to-date and accurately reflect the network administrator's requirements, and that any changes to the policy rules are propagated to the relevant components in a timely and efficient manner.

Figure 3:
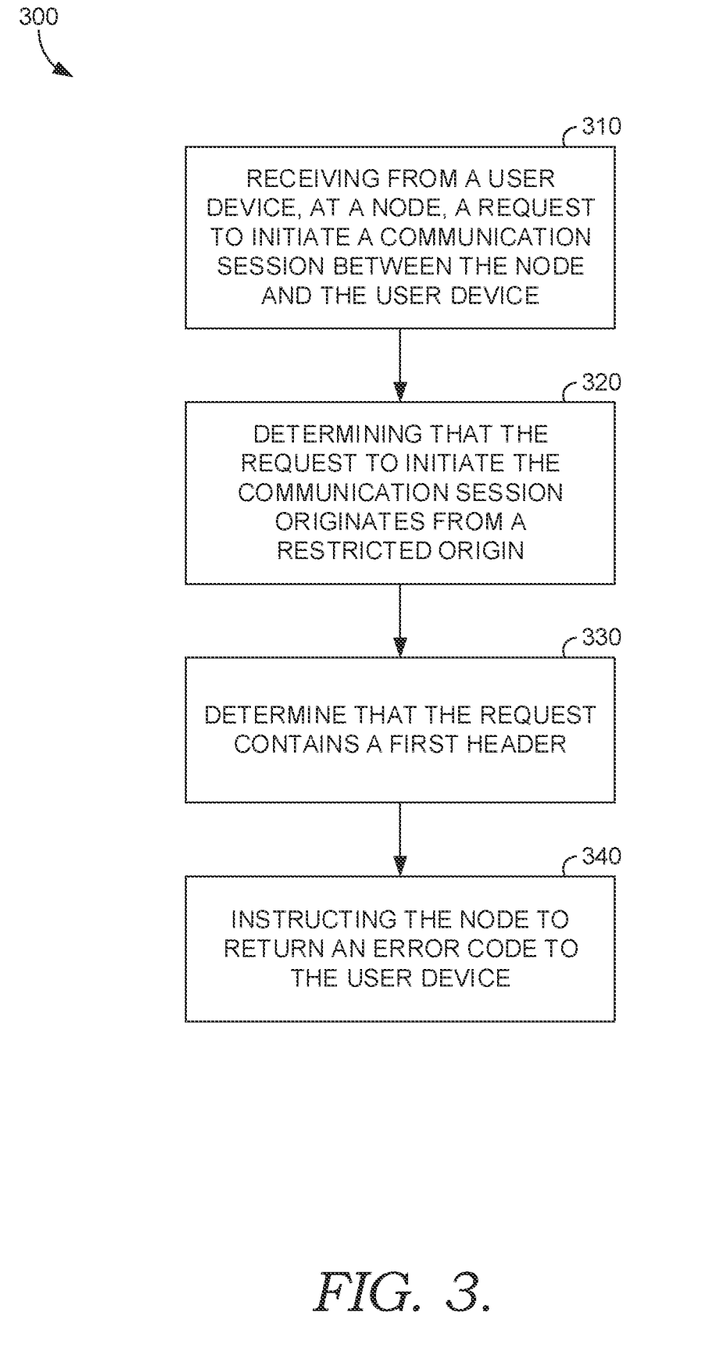
FIG. 3 each depict an example diagram of a graphical representation of an overall band operating on a single cellular base station, in accordance with an embodiment of the present technology.

Turning now to FIG. 3, an exemplary method 300 for mitigating the effects of user devices operating in a resource constrained network is presented. At step 310, when a user device sends a request to initiate a communication session to a node, the node receives this request. The node at step 320 determines if the request originates from a restricted origin, such as a non-terrestrial PLMN, by examining the source network information provided in the request header. If the request is found to originate from a restricted origin, the node proceeds with further analysis.

Next, at step 330 the node checks if the request contains a first header. In one instance, the first header is the P-Access-Network-Information header (P-ANI), which contains a list of restricted PLMNs. If the P-ANI header indicates that the source network is restricted, then the node proceeds with instruction to return an error code to the user device.

The node, at step 340, uses an instruction to return an error code to the user device as a way to prevent the communication session from being initiated. This is done in accordance with the policy to reject voice call attempts from devices originating from restricted origins, as described in the patent claims. The error code returned by the node can be any appropriate SIP error code, such as a 503 error code.

This process of receiving a request from a user device, checking if it originates from a restricted origin, and then determining if it contains the P-ANI header and returning an error code to the user device if necessary is carried out by the node. This node can be a SBG or a P-CSCF.

Figure 4:
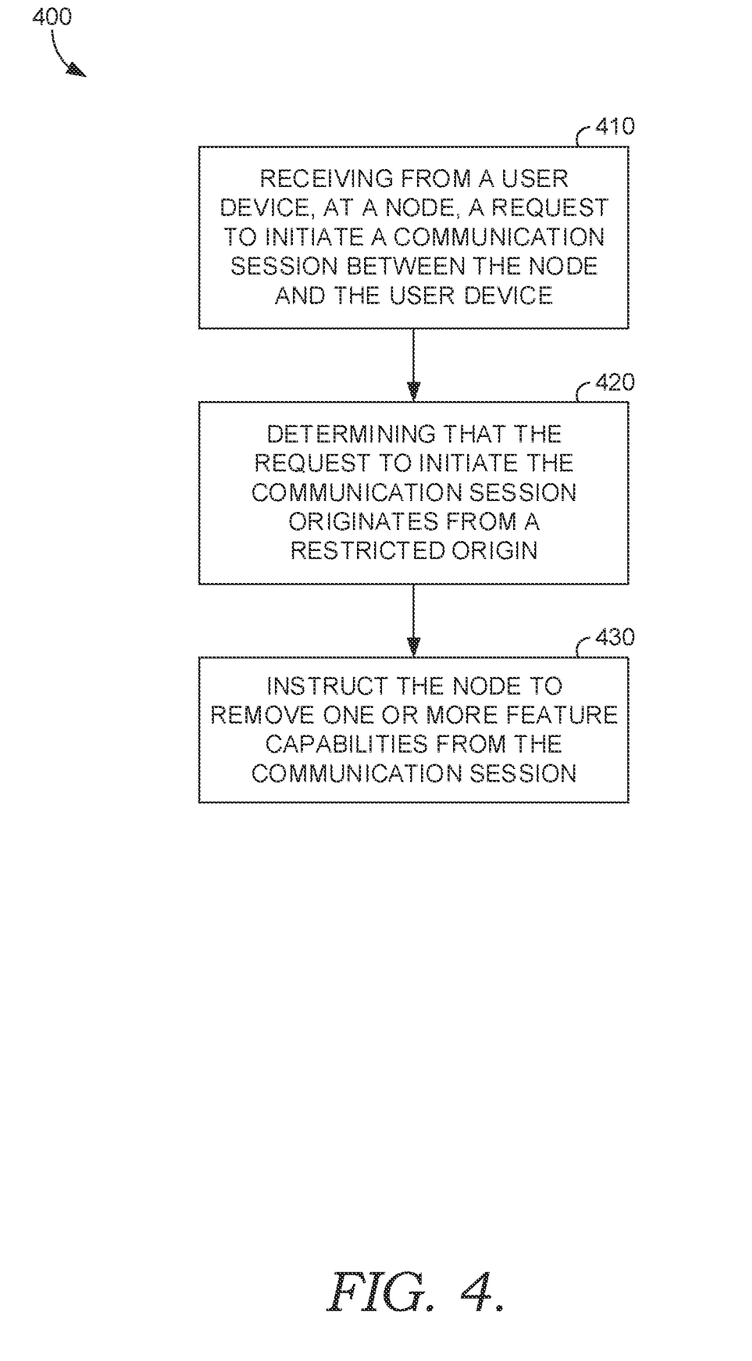
FIG. 4 depicts a block diagram of an exemplary method of mitigating the effects of overlapping bandwidth parts, in accordance with an embodiment of the present technology.

Turning now to FIG. 4, an exemplary method 400 for mitigating the effects of user devices operating in a resource constrained network is presented. At step 410, a communication network node may receive a request from a user device to initiate a communication session between the node and the user device. The node may then, at step 420, analyze the request to determine if it originates from a restricted origin, such as a non-terrestrial PLMN. If the request originates from a restricted origin, the node, at step 430, may need to modify the communication session to ensure that it complies with the available resources and policies of the network.

To comply with network policies, the node may, at step 430, be instructed to remove one or more feature capabilities from the communication session. These feature capabilities may be related to RCS and presence, which may not be available on the restricted origin network due to limited resources. For instance, the node may remove feature tags related to file transfer or presence indication, and thereby limit the communication session to messaging and low-data rate services.

The removal of feature capabilities may be carried out by instructing the node to remove specific feature tags from the communication session headers. For instance, the node may remove the '3gpp-service.ims.icsi.oma.cpm.filetransfer' tag from the invite header to prevent file transfer capability. By doing so, the node ensures that only the available and allowed features are being used in the communication session.

The removal of feature capabilities from the communication session may also involve instructing the Serving Call Session Control Function (S-CSCF) to prohibit triggering third party registration to different application servers, such as RCS and Presence servers. This means that the final 200 OK for the REGISTER method back to the User Equipment (UE) will lack any of the RCS feature tags. Additionally, to further restrict any non-compliant UEs, the Proxy Call Session Control Function (P-CSCF) may enforce blocking for any RCS and presence incoming traffic, by blocking RCS invite, RCS message, presences subscribe, and presence publish with the respective SIP error codes.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A system comprising:
    a node comprising one or more processors and one or more computer storage hardware devices storing computer-usable instructions, that, when used by the one or more processors, cause the one or more processors to:
        receive a request from a user device, via a satellite radio access network (RAN) node, to register the user device with the satellite RAN node for one or more services;
        register the user equipment with the satellite RAN node for the one or more services;
        determine that a first service of the one or more services is not provided by the satellite RAN node based on a determination that the request to register the user device originates from a restricted origin;
        receive a request from the user equipment, via the satellite RAN node, to access the first service;
        cause the satellite RAN node to respond to the user equipment that the request failed, and that the UE should remain attached to the satellite RAN node; and
        cause the satellite RAN to remove of one or more feature capabilities from a communication session established in response to the request to access the first service.

2. The system of claim 1, wherein the satellite RAN node is a satellite.

3. The system of claim 1, wherein the causing the satellite RAN node to respond is performed by modifying one or more header fields of a session initiation protocol message.

4. The system of claim 1, wherein the causing the satellite RAN node is performed by removing one or more feature capabilities.

5. The system of claim 1, wherein the satellite RAN node is further configured to instruct a policy engine to remove one or more feature capabilities from the communication session.

6. The system of claim 5, wherein the satellite RAN node is further configured to send a response message to the user device indicating the removal of one or more feature capabilities from the communication session.

7. The system of claim 1, wherein the satellite RAN node is further configured to receive an indication that the user device supports one or more feature capabilities, and determine whether to remove the one or more feature capabilities based on the indication.

8. A method of managing communication sessions comprising:
    receiving, via a satellite radio access network (RAN) node, a request from a user device to register the user device with the satellite RAN node for one or more services;
    registering the user equipment with the satellite RAN node for the one or more services;
    determining that a first service of the one or more services is not provided by the satellite RAN node based in part on a determination that the request to register the device originates from a restricted origin;
    receiving a request from the user equipment to access the first service;
    instructing the removal of one or more feature capabilities from a communication session established in response to the request from the user equipment to access the first service; and
    causing the satellite RAN node to respond to the user equipment that the request failed, and that the UE should remain attached to the satellite RAN node.

9. The method of claim 8, wherein the satellite RAN node is a satellite.

10. The method of claim 8, wherein the causing the satellite RAN node to respond is performed by modifying one or more header fields of a session initiation protocol message.

11. The method of claim 8, wherein the causing the satellite RAN node is performed by removing one or more feature capabilities.

12. The method of claim 11, wherein the satellite RAN node is further configured to send a response message to the user device indicating the removal of one or more feature capabilities from the communication session.

13. The method of claim 8, wherein the satellite RAN node is further configured to instruct a policy engine to remove one or more feature capabilities from the communication session.

14. One or more non-transitory computer-readable media having computer-executable instructions embodied thereon that, when executed, perform a method comprising:
    receiving, via a satellite radio access network (RAN) node, a request from a user device to register the user device with the satellite RAN node for one or more services;
    registering the user equipment with the satellite RAN node for the one or more services;
    determining that a first service of the one or more services is not provided by the satellite RAN node based in part on a determination that the request to register the user device originates from a restricted origin;

receiving a request from the user equipment to access the first service;

instructing the removal of one or more feature capabilities from a communication session established in response to the request from the user equipment to access the first service; and causing the satellite RAN node to respond to the user equipment that the request failed, and that the UE should remain attached to the satellite RAN node.

15. The one or more non-transitory media of claim 14, wherein the satellite RAN node is a satellite.

16. The one or more non-transitory media of claim 14, wherein the causing the satellite RAN node to respond is performed by modifying one or more header fields of a session initiation protocol message.

17. The one or more non-transitory media of claim 14, wherein the feature capabilities removed are rich communication services (RCS) and presence feature tags.

18. The one or more non-transitory media of claim 17, wherein the satellite RAN node is further configured to send a response message to the user device indicating the removal of one or more feature capabilities from the communication session.

19. The one or more non-transitory media of claim 14, wherein the causing the satellite RAN node is performed by removing one or more feature capabilities.

20. The one or more non-transitory media of claim 14, wherein the satellite RAN node is further configured to receive an indication that the user device supports one or more feature capabilities, and determine whether to remove the one or more feature capabilities based on the indication.

* * * * *